(12) United States Patent
Schaefer et al.

(10) Patent No.: US 10,624,726 B2
(45) Date of Patent: Apr. 21, 2020

(54) ORAL CARE IMPLEMENT

(71) Applicant: Braun GmbH, Kronberg (DE)

(72) Inventors: Norbert Schaefer, Frankfurt (DE); Joern Utsch, Eschborn (DE)

(73) Assignee: BRAUN GMBH, Kronberg (DE)

( * ) Notice: Subject to any disclaimer, the term of this patent is extended or adjusted under 35 U.S.C. 154(b) by 238 days.

(21) Appl. No.: 15/821,695

(22) Filed: Nov. 22, 2017

(65) Prior Publication Data
US 2018/0140404 A1 May 24, 2018

(30) Foreign Application Priority Data
Nov. 23, 2016 (EP) .................................... 16200171

(51) Int. Cl.
*A46B 13/02* (2006.01)
*A61C 17/22* (2006.01)
*A61C 17/34* (2006.01)

(52) U.S. Cl.
CPC ............ *A61C 17/222* (2013.01); *A46B 13/02* (2013.01); *A61C 17/22* (2013.01); *A61C 17/225* (2013.01); *A61C 17/34* (2013.01); *A46B 2200/1066* (2013.01)

(58) Field of Classification Search
CPC ....... A46B 13/02; A61C 17/22; A61C 17/222; A61C 17/225; A61C 17/34
See application file for complete search history.

(56) References Cited

U.S. PATENT DOCUMENTS

| 5,213,434 | A | * | 5/1993 | Hahn | A61C 17/3436 403/59 |
|---|---|---|---|---|---|
| 5,577,285 | A | | 11/1996 | Drossler | |
| 5,617,601 | A | | 4/1997 | McDougall | |
| 6,349,442 | B1 | * | 2/2002 | Cohen | A61C 17/22 15/22.1 |
| 7,614,107 | B2 | * | 11/2009 | Cobabe | A46B 5/0075 15/22.1 |
| 9,226,808 | B2 | | 1/2016 | Utsch et al. | |
| 9,724,181 | B2 | | 8/2017 | Schaefer et al. | |
| 2011/0289699 | A1 | | 12/2011 | Schaefer et al. | |
| 2013/0029290 | A1 | * | 1/2013 | Utsch | A61C 17/3436 433/147 |
| 2015/0320529 | A1 | | 11/2015 | Schaefer et al. | |

FOREIGN PATENT DOCUMENTS

| EP | 2550937 | 1/2013 |
|---|---|---|
| EP | 2942032 | 11/2015 |
| JP | H09173151 | 7/1997 |
| JP | 2011135981 | 7/2011 |

\* cited by examiner

*Primary Examiner* — Randall E Chin
(74) *Attorney, Agent, or Firm* — Vladimir Vitenberg (57) ABSTRACT

An oral-care implement having a housing extending along a longitudinal-extension direction, a functional element mounted at the housing for driven motion relative to the housing, a motion-transmitter element disposed within the housing and extending along the longitudinal-extension direction. The motion-transmitter element has a first coupling portion coupled with the functional element. The motion-transmitter element has a metal-sheet portion made from a punched and bent metal sheet. The metal-sheet portion can have at least one section having a non-flat cross-sectional shape in a plane perpendicular to the longitudinal-extension direction, such as an L-shape, or U-shape, or S-shape.

14 Claims, 7 Drawing Sheets

ORAL CARE IMPLEMENT

FIELD OF THE INVENTION

The present invention is concerned with an oral care implement having a functional element mounted at a hollow housing of the oral care implement for driven motion and a motion transmitter element disposed within the housing and connected with the functional element for transmitting a motion from a drive shaft of a handle of an oral care device to the functional element.

BACKGROUND OF THE INVENTION

It is known that a motion transmitter element can be used to transfer a motion provided by a drive shaft of a handle of an electric oral hygiene device (e.g. a toothbrush) to a functional element that is mounted at an at least partially hollow housing of an oral care implement attached to the handle for driven motion. The oral care implement typically is a repeatedly attachable and detachable replacement part that is thrown away once the functional element (e.g. a brush head) is worn out. Further typically, the oral care implement has an elongated and slim housing (allowing pushing the housing into the oral cavity to bring the functional element to a treatment location, e.g. a molar or a wisdom tooth) and the motion transmitter element is used to, e.g., allow using a short drive shaft at the handle. The motion transmitter element thus is coupled with the functional element on a first end and is structured to couple with the drive shaft at a second end. It has been described to realize such a motion transmitter element as a multi-component element comprising a T-shaped metal connector, where the leg of the T is realized as a metal rod and the cross-bar of the T is realized as a another metal rod that is welded to the metal rod that forms the leg. Further, it is known that the part that is intended for coupling to the drive shaft can be realized as a plastic injection molded part that is connected with the T-shaped metal rod part, e.g. by a push-fit or a press-fit. Document EP 0 624 079 B1 generally describes such a motion transmitter.

It is an object of the present disclosure to provide an oral care implement and a method of making an oral care implement that are improved over the known devices and methods or provide at least an alternative in view of the known devices or methods.

SUMMARY OF THE INVENTION

In accordance with one aspect there is provided an oral care implement comprising a housing extending along a longitudinal extension direction, a functional element mounted at the housing for driven motion relative to the housing, a motion transmitter element disposed within the housing and essentially extending along the longitudinal extension direction, the motion transmitter element having a first coupling portion being coupled with the functional element, wherein the motion transmitter element has a metal sheet portion that is made from a punched and bent metal sheet, in particular wherein the metal sheet portion has at least one section having a non-flat cross sectional shape in a plane essentially perpendicular to the longitudinal extension direction such as an L-shape or U-shape or S-shape.

In accordance with one aspect there is provided a method of making an oral care implement comprising the steps of:
providing a housing extending along a longitudinal extension direction;
providing a functional element;
providing a metal sheet;
punching and folding the metal sheet to form a metal sheet portion of a motion transmitter element;
disposing the motion transmitter element within the housing; and
connecting the functional element with the housing and in this step coupling a first coupling portion provided at a first end of the motion transmitter element with the functional element.

BRIEF DESCRIPTION OF THE DRAWINGS

The present disclosure is elucidated by a detailed description of example embodiments and by reference to figures. In the figures

DETAILED DESCRIPTION OF THE INVENTION

In accordance with the present disclosure, a motion transmitter element of an oral care implement (e.g. a repeatedly attachable and detachable replacement brush) has at least a portion that is made from a punched and bent metal sheet (the "metal sheet portion"). It shall be understood that this means that a part (a metal sheet blank) is punched or stamped out of a metal sheet and is successively or simultaneously folded or bent (several punching and/or bending steps may be foreseen). Terms like "stamped and bent" or "punched and bent" or "stamped and folded" or "punched and folded" are considered as synonymous. A metal sheet used for making the metal sheet portion may have a typical thickness in the range of between 0.10 mm to 0.30 mm, in particular in a range of between a 0.15 mm to 0.25 mm, further in particular of about 0.20 mm so that the motion transmitter element becomes relatively light-weight despite being made from metal. The metal sheet portion becomes relatively rigid if the metal sheet portion has at least in one section along its longitudinal extension direction a cross-sectional shape in a plane perpendicular to its longitudinal extension direction that is U-like, S-like, Z-like, C-like, V-like, W-like, or L-like (that is: a shape that is not closed but can be drawn by a single movement from one end to the other without drawing one section of the shape more than once). The U-like, C-like, V-like etc. section(s) of the metal sheet portion can serve as a receptacle for accommodating another part of the motion transmitter element (e.g. the leg of a T-shaped metal rod element, as will be discussed in more detail further below). The steps of punching and folding (where there may be more than one sub-step for each of the punching or folding steps) can be realized via consecutively arranged punching and folding machines or machine sections (e.g. one or several punching machine(s)/machine section(s) followed by one or several consecutive folding machine(s)/machine section(s)) so that the tact rate of the manufacturing is high despite a potential complexity of the folding steps. At each of the punching and folding section(s), a plurality of metal sheet pieces may be simultaneously processed, e.g. 2, 3, 4, 6, 8, 12, 16, 20, 32, 64 etc. metal sheet portions may be made in each work cycle of the punching and folding machines/machine sections. At least one further treatment machine or machine section may follow after the punching and folding—e.g. at least one further element such as massive metal element may be connected with the metal sheet portion to form the final motion transmitter. If the final motion transmitter element does not comprise a molded plastic injection molded part, no cooling time of the respective injection molding step is required as is needed in prior art motion transmitter elements that are at least partly made from injection molded plastic material. But it shall not be excluded that the motion transmitter element comprises a part that is made by plastic injection molding or generally made from a plastic material. A motion transmitter element made as a three-component part with a hinge section realized as a living hinge made from a suitable injection molded plastic material is discussed in EP 2 942 032 A1, which is incorporated herein by reference.

While the motion transmitter element may be mechanically coupled with a drive shaft of a handle, the examples mainly discussed herein focus on a magnetic coupling between the motion transmitter element and the drive shaft, e.g. the drive shaft may comprise a massive metal element such as a permanent magnet (or a block of magnetizable material) that can magnetically couple with another permanent magnet or block of magnetizable material (one of the coupling partners must of course have a permanent magnetic field). A second coupling portion of the motion transmitter element realized at a second end thereof may comprise the massive metal element (e.g. a permanent magnet or a block of magnetizable material). The second coupling portion of the motion transmitter element may be formed by a part of the metal sheet portion and may comprise a receptacle for accommodating the massive metal element (e.g. permanent magnet or block of magnetizable material). The receptacle may comprise projections that are suitable for centering the coupling partner of the massive metal element with respect to the receptacle (and thus with respect to the massive metal element)—i.e. the receptacle may comprise self-centering structures. The massive metal element (e.g. permanent magnet or block of magnetizable material) may be fixedly connected within the receptacle, e.g. by gluing or welding (e.g. laser welding). In embodiments where the massive metal element is a permanent magnet, the permanent magnet may be made from NdFeB material. In embodiments where the massive metal element is formed from a block of magnetizable material, the magnetizable material may be magnetizable steel or iron. The massive metal element may be a sintered part. Magnetic coupling of an oral care implement to a handle is, e.g., discussed in EP 2 550 937 B1 and EP 2 550 940 B1, the content of which is incorporated herein by reference. As said, this shall not limit the present disclosure to oral care implements having a motion transmitter that is arranged to magnetically couple with a drive shaft, but oral care implements having a motion transmitter that is arranged to mechanically couple with a drive shaft shall explicitly be included. E.g. the motion transmitter element (in particular the metal sheet portion) may comprise a snap hook, e.g. punched and folded snap hook to snap into a receptacle of the drive shaft or vice versa.

The permanent magnet or the block of magnetizable material may have any form (which form always fits into a smallest approximation cylinder, e.g. a cube fits into a cylinder having a diameter equal to the length of the diagonal of a quadratic side face of the cube) or may have an essentially cylindrical form. This cylinder may have a height in the range of between of 6.0 mm to 7.0 mm, in particular of about 6.5 mm, and a diameter in a range of between 5.0 mm and 6.0 mm, in particular of about 5.5 mm. If the block of magnetizable material or the permanent magnet has not an essentially cylindrical form, the permanent magnet or block of magnetizable material fills the smallest approximation cylinder to about 90% or about 85% or about 80% or about 75% or about 70% or about 60% (where a form that fills the smallest approximation cylinder more than 90% is considered as having an essentially cylindrical form). But it shall be understood that these dimensions are non-limiting and may be suitable for one particular design or one particular coupling force required between the coupling partners. E.g. when using two permanent magnets the same coupling force can be achieved with smaller sized coupling partners than using a permanent magnet and an iron block. As the oral care implement may in particular be a disposable part, an iron block is less costly and may thus balance out the higher volume in a pros and cons consideration). Other designs and/or other required coupling forces may lead to other dimensions.

The metal sheet from which the metal sheet portion of the motion transmitter element is made may in particular be spring band steel such as 1.4310 (X10CrNi18-8), while this shall not be interpreted as limiting and other suitable metal sheet materials may be used as well.

The motion transmitter element is coupled at a first coupling section with the functional element (e.g. a bristle carrier in case the oral care implement is a (replaceable) brush head, but it may also be a gum massage head, a flossing head, a tongue cleaning head etc.). As is known, the motion transmitter element may be coupled to the functional element with a rod-like element that engages into a receptacle of the functional element. If motion is transmitted in operation from a drive shaft to the motion transmitter element, the movement of the motion transmitter element is transferred to the functional element, which is then moved with respect to a motion axis. The motion axis may be a rotation axis around which the functional element may be rotated or oscillated or the functional element may also be moved in another manner, e.g. may be linearly reciprocated along a linear motion axis etc.

It was found that a rod-like element made from punched and folded sheet metal may under certain circumstances bend or deform when it is pushed into a receptacle (e.g. a bore) in which the rod-like element is to be accommodated essentially without any play. Thus, in some embodiments, the first coupling section comprises a massive metal coupling element, where "massive" means that the massive metal coupling element has a metal thickness in three dimensions that is well above the thickness of the metal sheet in order to provide high rigidity. The metal sheet may have a thickness in the range of between 0.10 mm to 0.30 mm and the massive metal coupling element may have a thickness or diameter of at least about 0.5 mm or at least about 1.0 mm, e g may have thickness or diameter in a range of between 1.0 mm and 3.0 mm E g the massive metal coupling element may be or comprise a rod-like element or a sphere-like element. The massive metal coupling element may be connected to the metal sheet portion of the motion transmitter element by any suitable connection technique, e.g. by welding (such as laser welding) or gluing. As mentioned before, the massive metal coupling element may be essentially rod-like or it may comprise two rod-like elements that are connected (e.g. welded together) so that they form a T-shape or an L-shape, where one rod-like element (e.g. the leg of the T) is then connected with the metal sheet portion of the motion transmitter element. The respective connection section of the metal sheet portion may in particular have a U-shaped cross section in a plane perpendicular to its length extension direction so that the rod-like element can be lengthwise accommodated in the U-shaped profile as will be discussed in a third example embodiment further below.

In some embodiments, the first coupling portion is realized by a part of the metal sheet portion and in particular comprises a coupling cylinder that extends essentially perpendicular to the longitudinal extension direction of the motion transmitter element. The first coupling portion may in particular be T-shaped or L-shaped. In some embodiments, the coupling cylinder is assembled from two essentially half-cylindrical sections that are arranged with a gap that extends along the length direction of the coupling cylinder. This allows contracting the coupling cylinder and thus balancing of manufacturing tolerances and adapting to the receptacle in which the coupling cylinder is to be received. The two cylinder halves may comprise meshing projections alternately arranged in length extension direction of the coupling cylinder. The meshed projections serve to stabilize the position of the cylinder halves to each other when they are pushed into a receptacle of the functional element as otherwise the cylinder halves may become misaligned when one of the cylinder halves experiences a higher friction or resistance than the other cylinder half. In some embodiments, the coupling cylinder has a chamfered front side, which improves the coupling with the receptacle by providing a self-centering effect.

In some embodiments, the metal sheet portion of the motion transmitter element comprises a hinge section that defines a pivot axis so that the two hinged sections of the motion transmitter element can pivot around the pivot axis. The pivot axis may in particular be oriented perpendicular to the length extension direction of the motion transmitter element. Such a hinge section is, e.g., sensible for embodiments, where one of the hinged parts of the motion transmitter element is coupled with a linearly vibrating drive shaft and thus moves in the vibration direction and the other hinged part is coupled with the functional element and makes a movement due to the linear vibration that is curved with respect to the vibration direction so that the hinged parts need to pivot with respect to each other. The previously mentioned document EP 2 942 032 A1 discloses a motion transmitter element where such a hinge section is realized as a living hinge made from a suitable injection molded plastic material. The hinge section in accordance with the present disclosure may comprise a flat metal-sheet hinge, i.e. a part of the metal sheet portion that is just flat without any folding of the respective metal sheet in the area of the flat metal sheet hinge. The flat metal sheet hinge may in particular be waisted with respect to the linear extension direction to more precisely define the pivot axis. The waisted flat metal sheet hinge then realizes a living hinge made from sheet metal.

Figure 1:
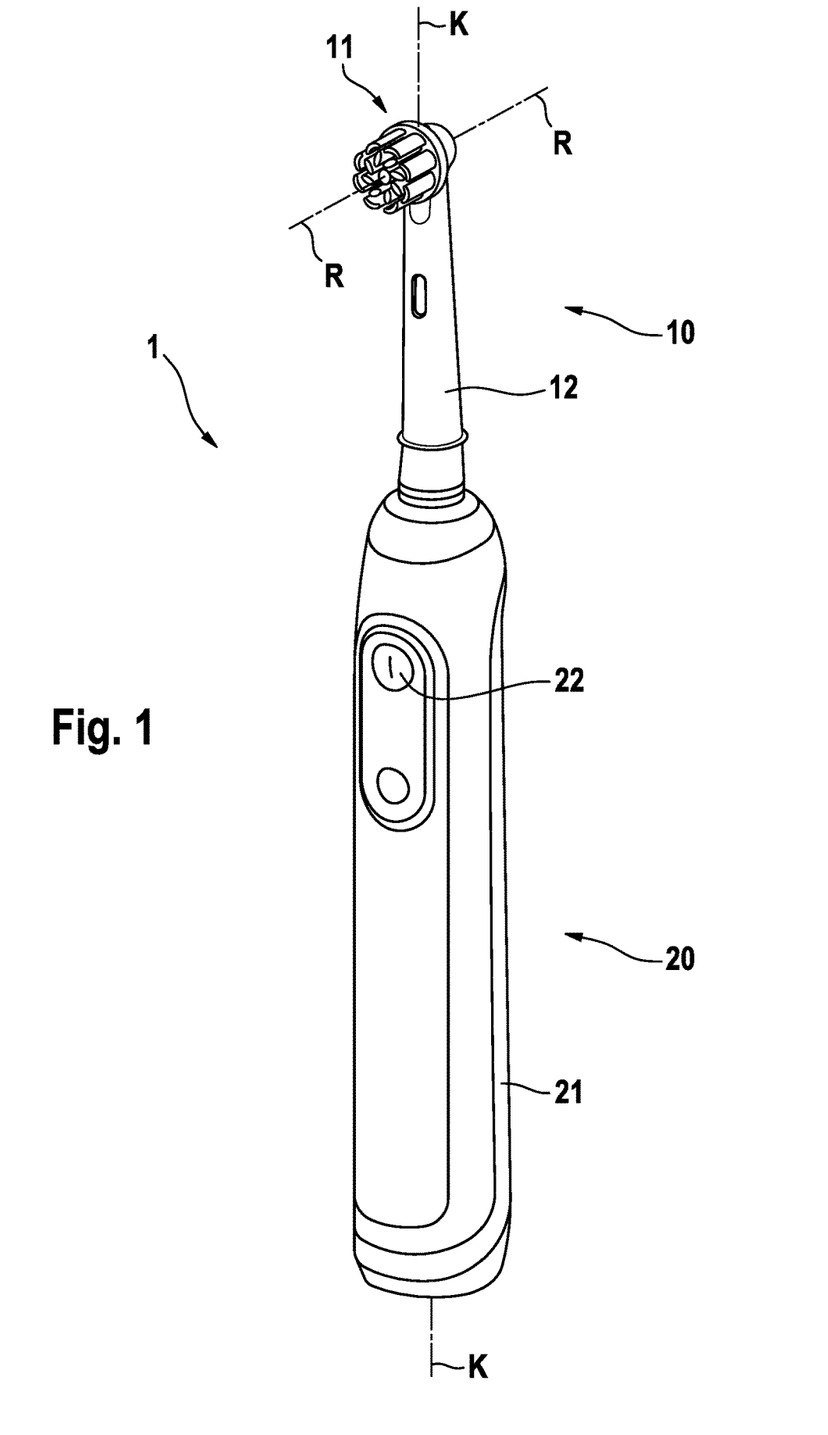
FIG. 1 is a depiction of an example oral care device.

FIG. 1 shows an example oral care device 1 that is here realized as an electric toothbrush comprising an oral care implement 10 that is here realized as a replaceable brush head and a handle 20. The oral care device 1 and the oral care implement 10 here extend along a common longitudinal extension direction K (in other embodiments, the handle 20 and the oral care implement 10 may extend along extension directions that are angled to each other). The oral care implement 10 comprises a functional element 11 that is mounted at a housing 12 of the oral care implement 10 for driven motion around a motion axis R, where the driven motion may in particular be a rotation or oscillatory rotation around the motion axis R. The handle 20 in the shown embodiment comprises a housing 21 arranged so that it can be grasped by a human hand and an ON/OFF-switch 22. In other embodiments, the device may comprise an automatic ON/OFF-switch that automatically switches on the drive (not shown) when the oral care device 1, in particular the functional element 11 comes close to a treatment area (e.g. this may be realized by a capacitive sensor that determines the proximity of certain material such as tooth material).

Figure 2A:
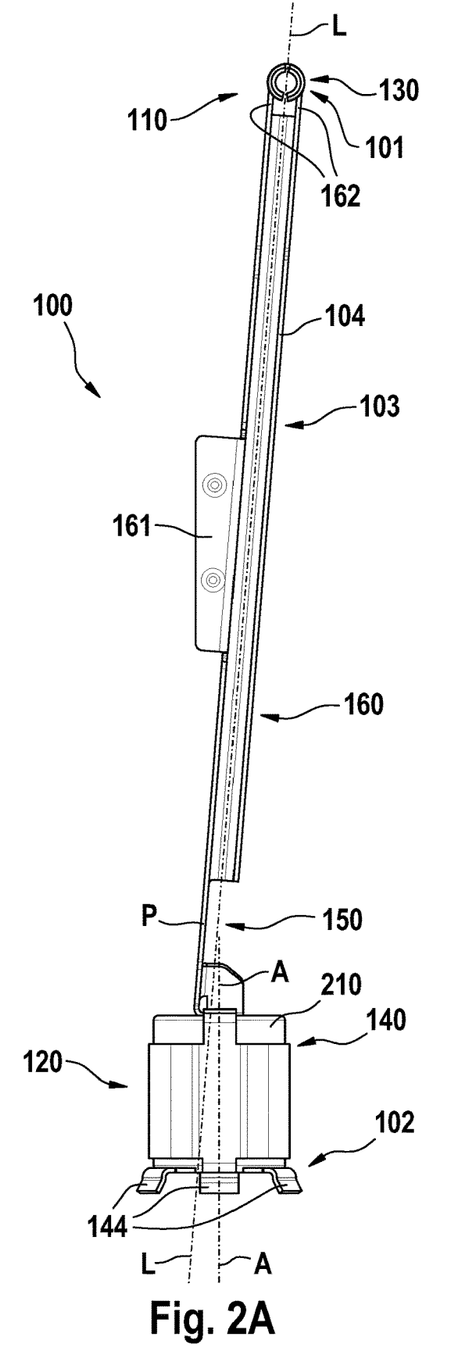
FIG. 2A is a side view onto a first embodiment of a motion transmitter element as proposed.
Figure 2B:
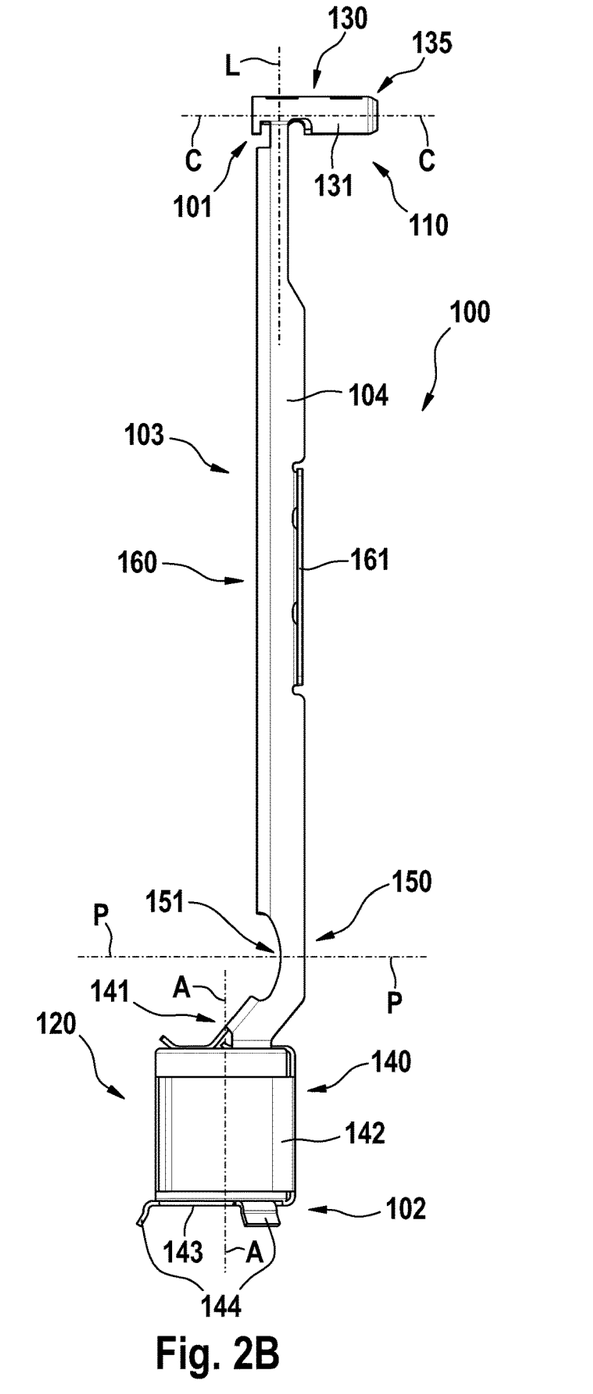
FIG. 2B is a side view that is taken from a 90 degrees rotated view direction onto the same motion transmitter element as shown in FIG. 3A.
Figure 5:
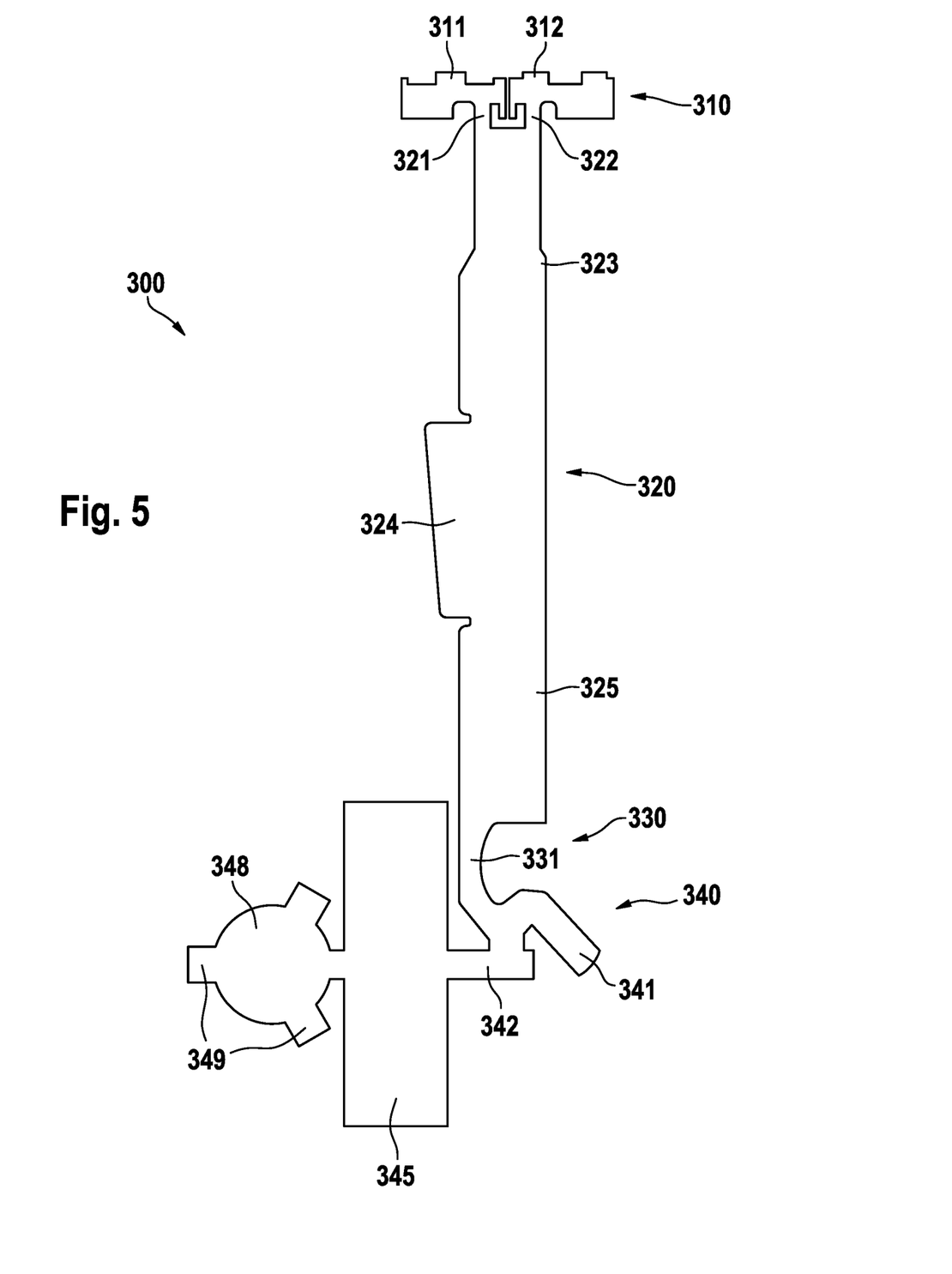
FIG. 5 is a depiction of an example punched-out metal sheet blank from which a portion a motion transmitter element as proposed can be made by bending.

FIGS. 2A and 2B are side-views of a first example embodiment of a motion transmitter 100 as proposed, where the side views are 90 degrees apart. Identical reference numerals in these two figures relate to identical features of the motion transmitter 100 and thus reference is made to both figures. The motion transmitter 100 generally extends along a longitudinal extension direction L and has a first end 101 and a second end 102 essentially opposite to the first end 101. A first coupling portion 110 is provided at the first end 101 and a second coupling portion 120 is provided at the second end 102. The motion transmitter 100 comprises a metal sheet portion 103 made from a punched and bent metal sheet 104 and a further massive metal element 210 that is realized as a magnetizable block of metal (e.g. magnetizable steel or iron). FIG. 5 discussed further below shows a depiction of a punched-out metal sheet blank 300 from which the metal sheet portion 103 can be made by bending operations.

The metal sheet portion 103 comprises here four main parts, namely a coupling cylinder 130 having a cylinder axis (or longitudinal extension axis) C that is essentially perpendicular to a longitudinal extension direction L of the motion transmitter 100, a middle section 160, a hinge section 150 defining a pivot axis P, and a receptacle 140 for receiving the massive metal element 210. The first coupling portion 110 realized by the coupling cylinder 130 and the second coupling portion 120 realized by the receptacle 140 and the massive metal element 210 will be described in more detail with respect to FIGS. 3 and 4.

Generally, the metal sheet portion may comprise a first coupling section at a first end and a second coupling section at a second end and an in particular elongated middle section extending in between. The coupling sections may be realized according to the needs of the embodiment, e.g. the coupling section may comprise a snap hook and/or a receptacle for receiving a snap hook. At least one coupling section may also be intended for a form fitting or press-fitting connection with another part. A hinge section may be provided if the two ends need to move relative to each other.

The middle section 160 serves to bridge a certain distance between the hinge section 150 and the first coupling portion 110 with a certain integral stability. In order to provide a suitably high stability of the middle section 160 against in particular traction forces and torsional forces the relatively thin metal sheet 104 (e.g. having a thickness of about 0.20 mm) is bent so as to have a generally U-shaped form in a plane perpendicular to the longitudinal extension direction L. The middle section 160 is here shown to comprise a side lug 161, which is merely optional and may be used for handling reasons. As has been mentioned before, the U-shape is just one of several cross-sectional forms that can be easily achieved by bending of a metal sheet blank.

The hinge section 150 is realized by a flat metal sheet hinge 151 that here is also waisted in order to more precisely define a pivot axis P around which the respective upper and lower portions of the motion transmitter 100 pivot with respect to each other when, e.g., a force acts upon the first coupling portion 120 in a direction that has a component that is normal to the plane defined by the cylinder axis C and the longitudinal extension direction L.

Figure 3:
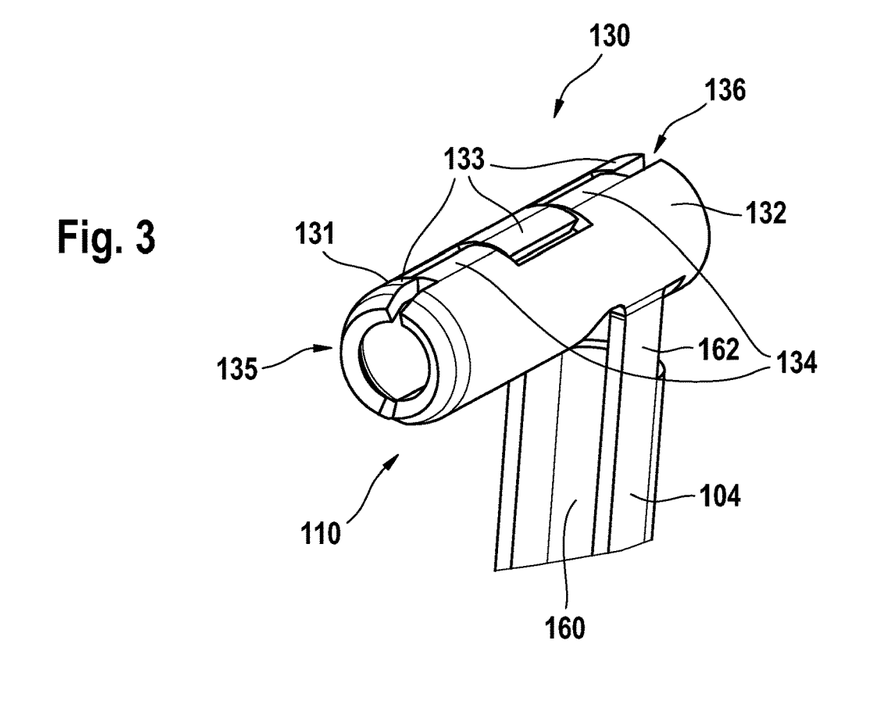
FIG. 3 is a perspective detail view onto a first coupling portion of the motion transmitter element shown in FIGS. 2A and 2B.

FIG. 3 is a perspective view onto the first coupling portion 110 of the motion transmitter 100 shown in FIGS. 2A and 2B. The first coupling portion 110 is here realized as a coupling cylinder 130 made from a part of the punched and bent metal sheet 104 of the metal sheet portion 103 of the motion transmitter 100. The coupling cylinder 130 is assembled from two semi-cylindrical sections 131 and 132 that each extend from one of the sides of the U-shaped middle section 160 of the metal sheet portion 103 and are each connected therewith by means of a connecting arm 162. The semi-cylindrical sections 131 and 132 are separated from each other by a gap 136 that extends the full length of the coupling cylinder 130. The gap 136 allows that the semi-cylindrical portions can be pushed closer together so that manufacturing tolerances in the diameter of the coupling cylinder 130 and the diameter of a receiving bore in the functional element can be balanced. The semi-cylindrical sections 131 and 132 have meshing projections 133 and 134 that serve to stabilize the coupling cylinder 130 in case one of the semi-cylindrical sections 131 or 132 experiences a higher resistance when being inserted into the receiving bore of the functional element (see FIG. 6). The coupling cylinder 130 has a chamfered front section 135, which is intended to be inserted first into the receiving bore of the functional element. The chamfered front section 135 has a self-centering effect when the coupling cylinder 130 is inserted into the receiving bore.

Figure 4:
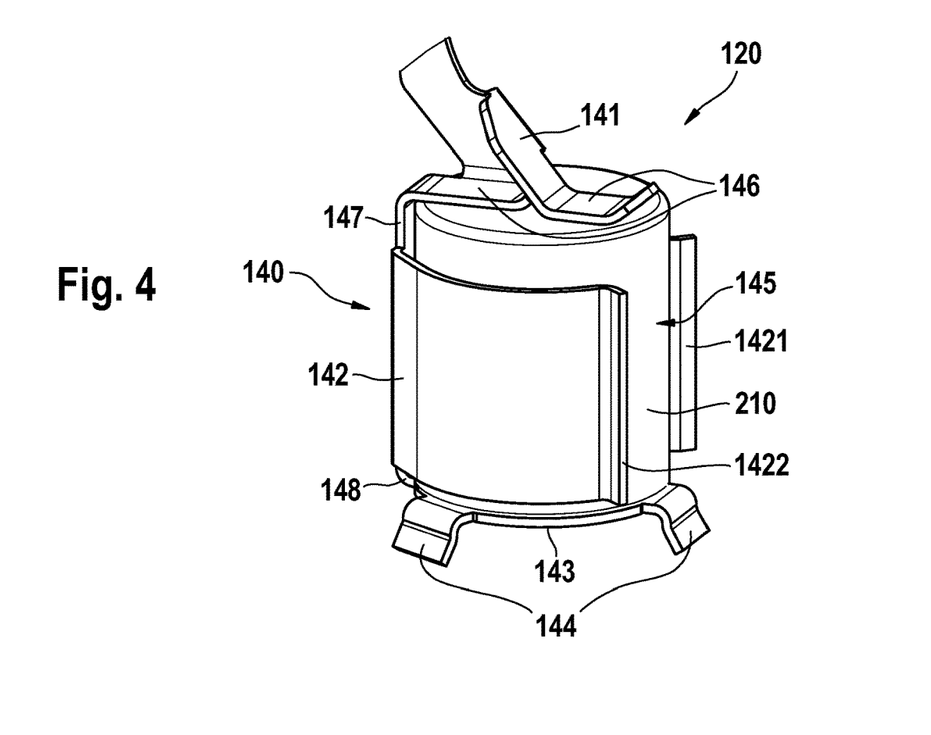
FIG. 4 is a perspective detail view onto a second coupling section of the motion emitter element shown in FIGS. 2A and 2B.

FIG. 4 is a perspective view onto the second coupling portion 120 of the motion transmitter 100 shown in FIGS. 2A and 2B. The second coupling portion 120 is here partly realized as a receptacle 140 made from a part of the punched and bent metal sheet 104 of the metal sheet portion 103 of the motion transmitter 100. Further, a massive metal element 210 is received in the receptacle 140 and is connected thereto to form the second coupling portion 120. The receptacle 140 has a top receptacle portion 141, a sheath portion 142 that envelopes the massive metal element 210, and a bottom receptacle portion 143. The top receptacle portion 141 may be fixedly connected with the massive metal element 210 at welding points 146. The top receptacle portion 141 may in particular be structured such that a high strength against being bent is achieved. The sheath portion 142 here has an opening 145 that extends along the full length of the sheath portion 142. The sheath portion 142 is connected with the top receptacle portion 141 via a bridge structure 147. The opening 145 in the sheath portion 142 is dimensioned such that the sheath portion 142 can open wide enough when the massive metal element 210 is pushed against outwards bent edge portions 1421 and 1422 so that the massive metal element 210 can slide into the cavity of the receptacle 140. The cavity's diameter may be somewhat smaller than the diameter of the here cylindrical massive metal element 210 so that the sheath portion 142 effectively clamps and holds the massive metal element 210. The bottom receptacle portion 143 is connected with the sheath portion 142 via a bridge structure 148. The bottom receptacle portion 143 has a flat circular center that is about as large as the circular bottom face of the cylindrical massive metal element 210. A plurality of projections 144 extend from the circumference of the circular center of the bottom receptacle portion 143. The projections 144 are bent downwards and slightly outwards so that they provide a self-centering function when the second coupling portion 120 is attached to a respective coupling partner of a drive shaft. In other embodiments, no bottom receptacle portion is present and the massive metal element may have been pushed into the cavity of the receptacle through the bottom opening of the receptacle (see e.g. FIGS. 7 and 8). The massive metal element 210 may be connected to the metal sheet portion 103 by any suitable connection technology such as (laser) welding or gluing.

It is to be noted that the particular realizations of the first and second coupling portions 110 and 120 are meant as examples and are not to be interpreted as limiting.

FIG. 5 is a depiction of a punched metal sheet blank 300 from which the metal sheet portion 103 of the motion transmitter 100 shown in FIGS. 2A and 2B can be made by further folding operations. While a fully flat metal sheet blank 300 is shown, this shall not be interpreted as excluding the possibility that during the punching step a simultaneous folding step is performed so that a fully flat metal sheet blank may never be present in the manufacturing process. The punched metal sheet blank 300 comprises a top portion 310 from which the first coupling portion 110 will be made via folding, a center portion 320, a hinge portion 330, and a receptacle portion 340. The top portion 310 comprises two bridge structures 321 and 322 that are each connected with a metal sheet portion 311 and 312, respectively, from which the semi-cylindrical portions of the coupling cylinder can be made. The center portion 320 comprises a first end portion 323, a hinge side portion 325, and a side lug 324. The hinge portion 330 comprises a waisted hinge sheet section 331. The receptacle portion 340 comprises two bridge elements 341 and 342 from which the top receptacle portion will be made via folding, a sheath portion 345 and a bottom receptacle portion 348 from which projections 349 extend.

Figure 6:
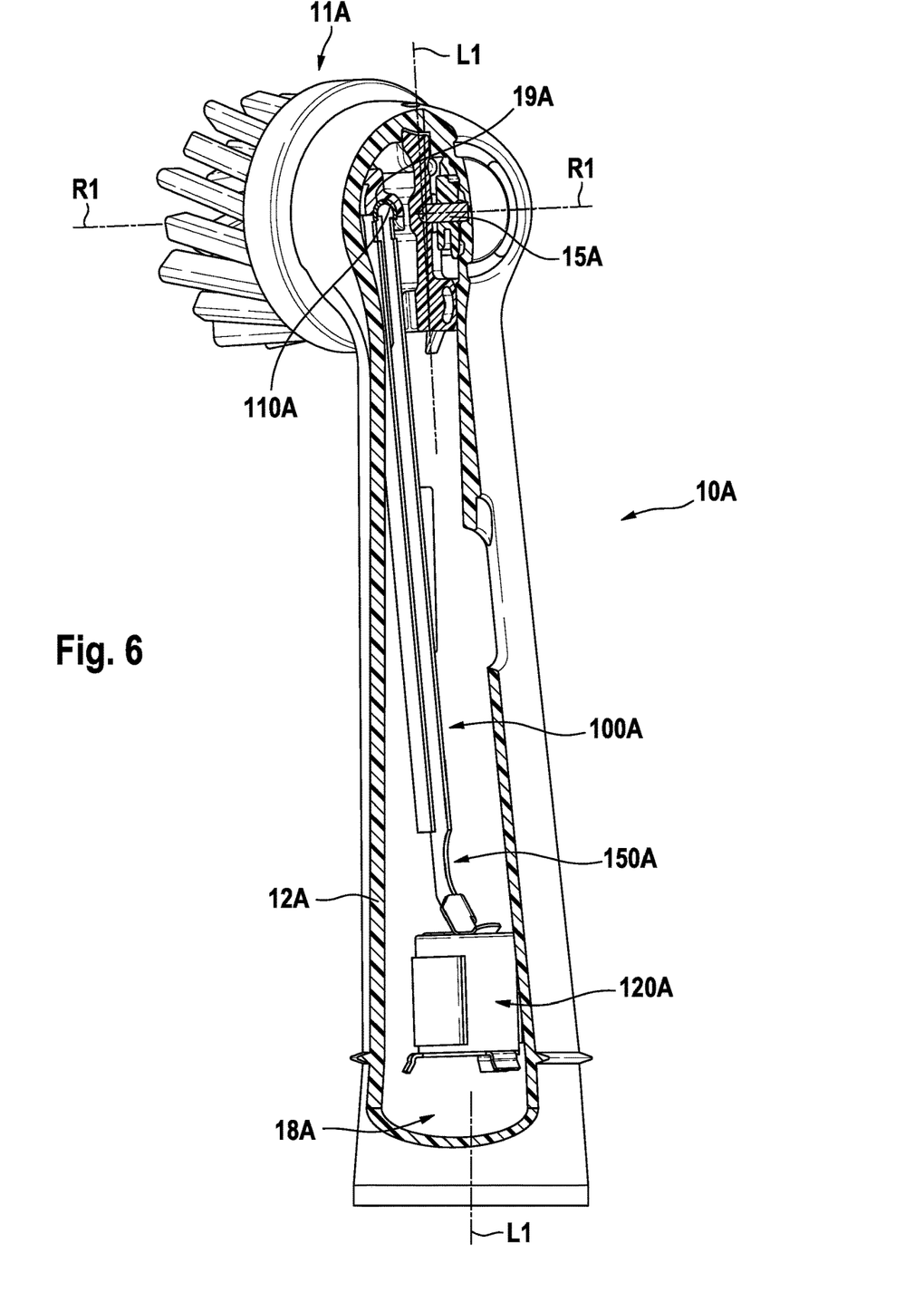
FIG. 6 is a depiction of an example oral care implement that is partially cut open so that a motion transmitter disposed within the hollow housing is visible.

FIG. 6 is a depiction of a partially cut open oral care implement 10A in which a motion transmitter 100A is visible that is connected on a first end 101A with a functional element 11A of the oral care implement 10A. The motion transmitter 100A is essentially identical to the motion transmitter 100 shown in FIGS. 2A and 2B. The functional element 11A is disposed at a first end of the oral care implement 10A, which functional element 11A here carries oral cleaning elements in the form of bristle tufts that extend from a mounting side of the functional element 11A. The functional element 11A comprises a coupling portion 19A having a cylindrical bore into which the first coupling portion 110A, which is here realized as a coupling cylinder made from sheet metal, of the motion transmitter 100A engages. The functional element 11A is mounted at a housing 12A of the oral care implement 10A and is born on an axle 15A allowing the functional element to rotate around a rotation axis R1 being essential perpendicular to the longitudinal extension direction L1 of the oral care implement 10A. A second coupling portion 120A of the motion transmitter 100A is disposed in a hollow 18A of the housing 12A of the oral care implement 10A. The second coupling portion 120A is arranged to couple with a drive shaft of a handle of an oral care device by means of magnetic forces as previously described. E.g. the second coupling portion 120A and the respective coupling portion of the drive shaft are attracted to each other by the magnetic force acting between them, which will cause the second coupling portion 120A (having a somewhat undetermined location in the hollow 18A as it is not fixedly mounted with respect to the housing 12A) to move towards the coupling portion of the drive shaft. Self-centering structures may support the coupling process, so that a determined coupling relationship between the second coupling portion 120A and the respective coupling portion of the drive shaft results. The drive shaft may then linearly vibrate along the longitudinal extension direction L1, which then causes the first coupling portion 110A, which is positively fitted into the receiving bore of the coupling portion 19A of the functional element 11A, to move along an arc around the rotation axis R1. In order to balance the angular motion of the first coupling portion 110A with respect to the second coupling portion 120A, a hinge section 150A is disposed between the two coupling portions 110A and 120A.

Figure 7:
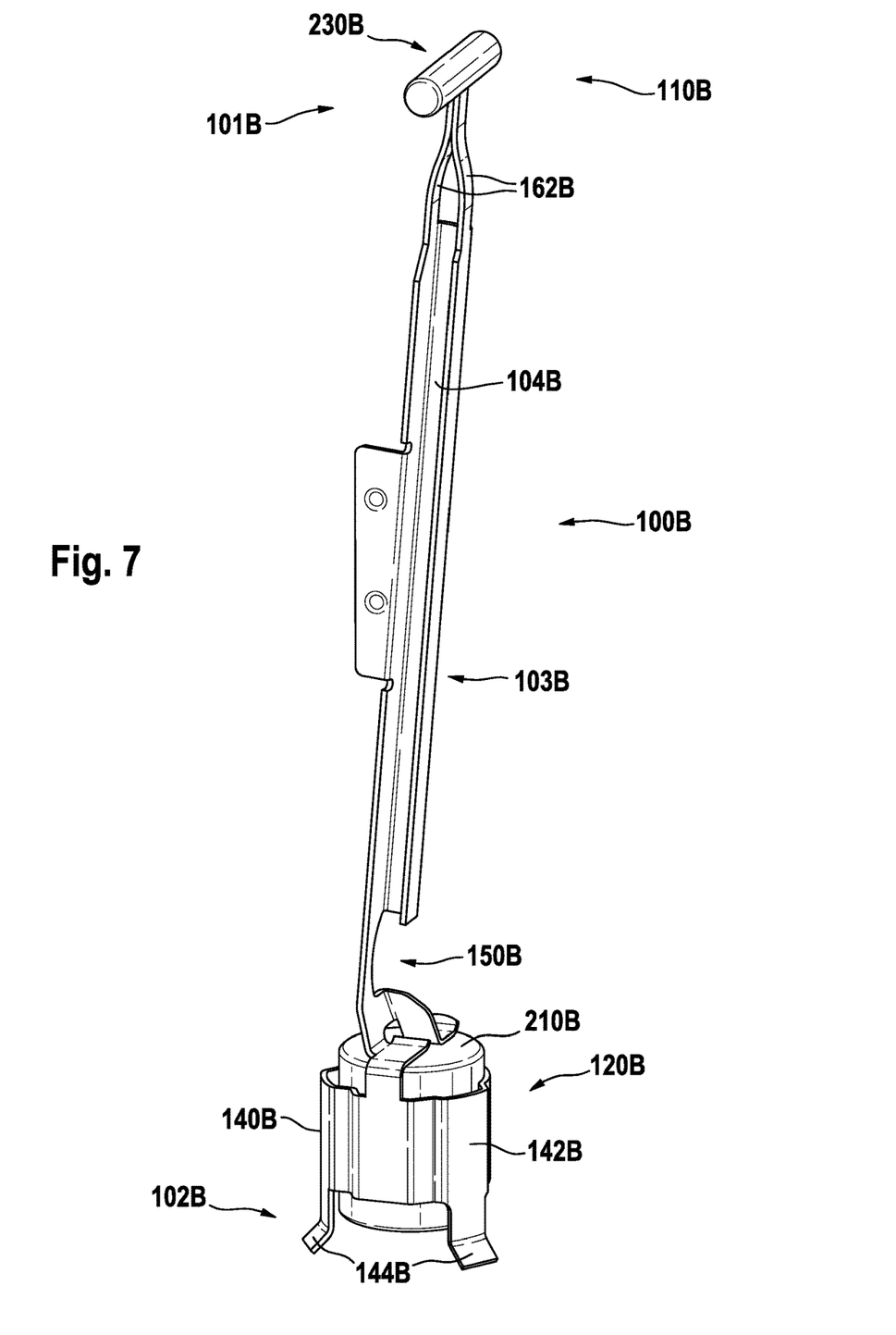
FIG. 7 is a perspective view onto a second embodiment of a motion transmitter element comprising a massive metal element at a first end.

FIG. 7 is a perspective depiction of a second example embodiment of a motion transmitter 100B, where the first coupling portion 110B is realized by a massive metal element 130B in the form of a short rod. Obviously, in such an embodiment, the first coupling portion 110B of the motion transmitter 100B is not an integral piece made from sheet metal, but is a separate part that then needs to be welded to or otherwise fixedly secured at the sheet metal. In the shown embodiment, two arms 162B extend from an U-shaped portion of a metal sheet portion 103B of the motion transmitter 100B, which arms 162A are connected with the massive metal element 130B, e.g. by means of welding. In contrast to the first example embodiment shown in FIGS. 2A and 2B, the second coupling portion 120B comprises a receptacle 140B without a bottom receptacle portion. The receptacle 140B comprises a sheath portion 142B from which self-centering projections 144B extend. In such an embodiment, the metal sheet can in particular be made from a non-magnetizable material.

Figure 8:
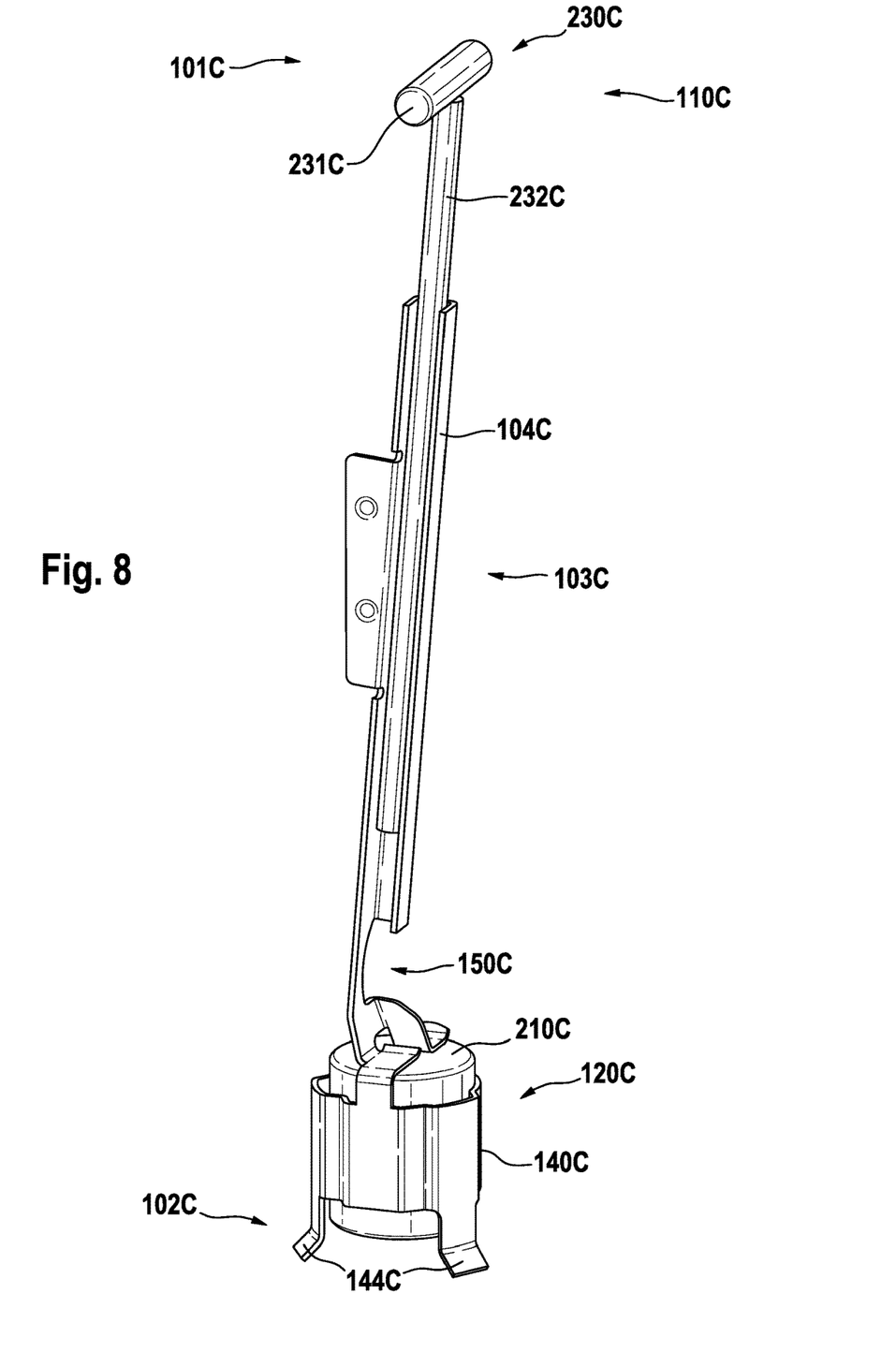
FIG. 8 is a perspective view onto a third embodiment of a motion transmitter element also comprising a massive metal element at a first end.

FIG. 8 is a perspective depiction of a third example embodiment of a motion transmitter 100C, where the first coupling portion 110C is realized by a massive metal element 130C in the form of two rods connected to each other to form a generally T-shaped rod element, where the crossbar 131C of the T may in particular have the same dimensions as in the embodiment shown in FIG. 7 (if it shall fit into the same receiving bore). In the shown embodiment, the metal sheet portion 103C does not extend as long towards the first end 101C of the motion transmitter 100C as in the second embodiment of FIG. 7 as the T-shaped metal rod element realizes the first coupling portion 110C. Again, the metal sheet portion 103C comprises a U-shaped portion extending along a certain distance between a hinge section 150C and the first end 101C of the motion transmitter 100C. The rod-like leg 132C of the T-shaped massive metal element 130C is received in the U-shaped portion of the metal sheet portion 103C along a certain distance so that the two elements can be connected by welding or gluing and a high rigidity and torsional strength is achieved. The second coupling portion 120C in the shown embodiment is realized essentially identical with the second coupling portion shown in FIG. 7 and thus it is referred to the previous paragraph.

The embodiment shown in FIG. 8 is an alternative to a motion transmitter discussed in the already mentioned EP 2 942 032 A1. Instead of an injection molded center part realizing the hinge section and providing the coupling to a T-shaped metal rod element and to a massive metal element, the present disclosures proposes to use a metal sheet portion that can be made by stamping and folding a planar metal sheet. As already explained, the folding of the metal sheet into cross sections such as L-shapes, U-shapes etc. generates the necessary stiffness in these folded parts of the metal sheet portion, while a planar and in particular waisted hinge section provides a resilient pivot. In consequence, all parts are made from metal and can be easily connected by gluing or welding. Stamping and folding and also welding are relatively fast processes so that an overall fast cycle time can be achieved. In contrast, plastic injection molding typically requires longer processing time and the injection molding machines are relatively costly and consume a lot of construction space.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An oral-care implement comprising a replacement brush head of an electric toothbrush, comprising:
   a housing extending along a longitudinal-extension direction;
   a functional element mounted at the housing for driven motion relative to the housing;
   a motion-transmitter element disposed within the housing and extending along the longitudinal-extension direction, the motion-transmitter element having a first coupling portion coupled with the functional element;
   wherein the motion-transmitter element has a metal-sheet portion made from a punched and bent metal sheet, wherein the metal-sheet portion has at least one section having a non-flat cross-sectional shape in a plane essentially perpendicular to the longitudinal-extension direction, said cross-sectional shape being selected from the group consisting of an L-shape, U-shape, and S-shape.

2. The oral-care implement of claim 1, wherein the first coupling portion is essentially L-shaped or T-shaped.

3. The oral-care implement of claim 1, wherein the motion transmitter element comprises a second coupling portion arranged at a second end of the motion-transmitter element.

4. The oral-care implement of claim 3, wherein the second coupling portion comprises a massive metal element comprising a permanent magnet or a magnetizable metal block accommodated in a receptacle formed by the metal-sheet portion, wherein the receptacle comprises at least a top receptacle portion and a sheath portion that has an opening extending along the full length of the sheath portion.

5. The oral-care implement of claim 4, wherein the receptacle has a bottom receptacle portion comprising projections extending from a circumference of the bottom receptacle portion, said projections being suitable for centering a coupling partner with respect to the massive metal element.

6. The oral-care implement of claim 1, wherein the metal sheet portion comprises a hinge section defining a pivot axis that extends essentially perpendicular to the longitudinal-extension direction, wherein the hinge section comprises a flat metal-sheet hinge that extends parallel to the pivot axis.

7. The oral-care implement of claim 6, wherein the flat metal-sheet hinge is waisted with respect to the longitudinal-extension direction.

8. The oral-care implement of claim 1, wherein the metal sheet has a thickness between 0.10 mm and 0.30 mm.

9. The oral-care implement of claim 1, wherein the first coupling section comprises a massive metal coupling element comprising a metal-rod element connected with the metal-sheet portion, wherein the massive metal coupling element is T-shaped rod, wherein a leg of the T-shaped rod element is accommodated in a receptacle formed by the metal-sheet portion having a U-shaped cross-section in a plane perpendicular to the longitudinal-extension direction, and wherein the massive metal coupling element has a thickness or diameter in the range from 1.0 mm to 3.0 mm.

10. The oral-care implement of claim 1, wherein the first coupling portion comprises a coupling cylinder made from the punched and bent metal sheet and that extends perpendicular to the longitudinal-extension direction.

11. The oral-care implement of claim 10, wherein the coupling cylinder comprises two essentially semi-cylindrical sections arranged with a gap extending along a length direction of the coupling cylinder, wherein the semi-cylindrical sections have meshing projections alternately arranged in the length direction of the coupling cylinder.

12. The oral-care implement of claim 10, wherein the coupling cylinder has a chamfered front section.

13. The oral-care implement of claim 1, wherein the metal sheet has a thickness between 0.15 mm to 0.25 mm.

14. The oral-care implement of claim 1, wherein the metal sheet has a thickness of about 0.20 mm.

* * * * *